J. W. PLACE.
PRESSURE GAUGE.
APPLICATION FILED MAR. 5, 1920.
1,414,153.
Patented Apr. 25, 1922.
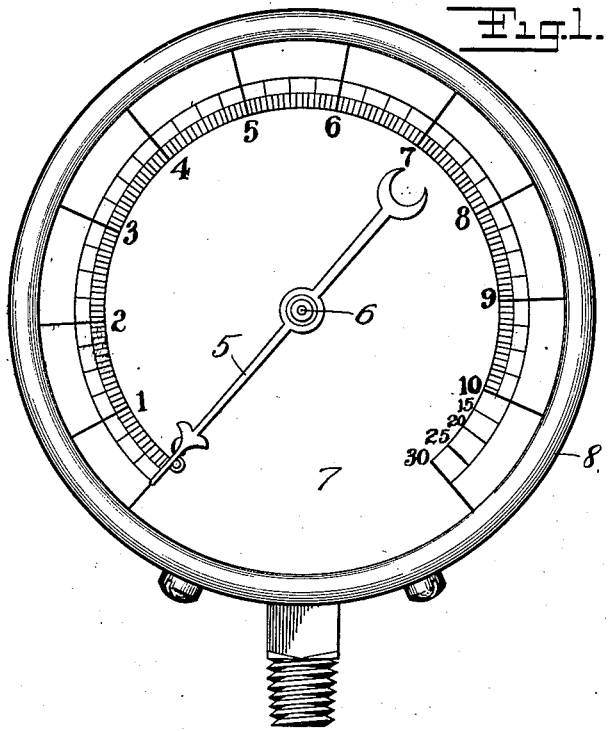
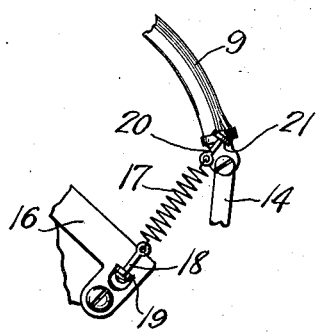
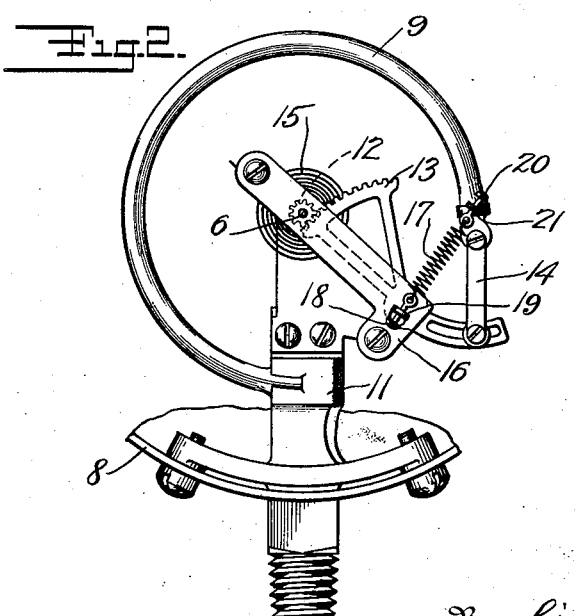
Inventor
Josiah W. Place
By his Attorneys

UNITED STATES PATENT OFFICE.

JOSIAH W. PLACE, OF ORANGE, NEW JERSEY, ASSIGNOR TO UNITED STATES GAUGE COMPANY, OF NEW YORK, N. Y., A CORPORATION OF PENNSYLVANIA.

PRESSURE GAUGE.

1,414,153.  Specification of Letters Patent.  Patented Apr. 25, 1922.

Application filed March 5, 1920. Serial No. 363,392.

*To all whom it may concern:*

Be it known that I, JOSIAH W. PLACE, a citizen of the United States of America, residing at Orange, Essex County, New Jersey, have invented a new and useful Pressure Gauge, of which the following is a specification.

My invention relates particularly to a gauge of the Bourdon type, and has for its main object the provision of simple and inexpensive means for retarding the action of the tube after a certain part of the scale has been traversed by the pointer so as to make it possible to indicate through a relatively small angular movement of the pointer considerable increases of pressure.

Briefly described, the invention may be considered as contemplating the use of a spring loosely connected between the movable end of the Bourdon tube and the frame, which spring is brought into play to effectively retard the movement of the tube after a certain range of movement which may be deemed the normal range of the gauge.

Fig. 1 is a front view of the gauge embodying the improvements of my invention.

Fig. 2 is a front view with the casing broken away, and showing the interior mechanism.

Fig. 3 is a fragmentary detail showing the end of the tube, the stationary frame, and the connecting spring which is brought into play at the higher pressures.

The pointer 5 is mounted on a shaft or spindle 6 in front of the dial 7 in a casing 8 in the usual manner. It will be noted that the scale on the dial is divided uniformly up to the number 10, and from there on the scale divisions indicating say five units of pressure are much closer together.

The tube 9 is of any suitable construction, and secured in any suitable manner to the base or support 11 in the casing. The spindle 6 carries a pinion 12 which meshes with a sector 13, whose slotted end is connected by a link 14 to the movable end of the tube in the usual manner. The spring 15 is also provided as customary, to connect the shaft or spindle and the frame 16, which supports the spindle and the swinging sector. The action of the parts thus far described is the same as ordinarily found in devices of this character.

To retard the action of the tube while the pointer is traversing the upper part of the scale say from division 10 to 30, I have provided a spring 17, which connects the free end of the tube 9 with the frame 16, and is adapted to be brought into play only when the pointer reaches the scale division 10, which may be considered the upper end of the normal scale range of the gauge. The connection between the spring 17 and the frame is effected by a terminal member 18 which is slidably supported in a lug 19 which projects upwardly from the frame. The other end of the spring is preferably connected in a similar manner by a terminal 20 slidably mounted in a lug 21 which projects from the movable end of the tube 9. During the normal range of movement of the parts, it will be seen that the spring has no effect upon the tube, but that when the free play between the terminal members 18 and 20 and the lugs 19 and 21 has been taken up, the spring will come into play and retard the expansive action of the tube, so that thereafter a given rise in pressure will produce a lesser angular movement of the pointer.

It will be seen that the parts are simple and inexpensive and readily applied to an ordinary gauge, and that the construction is such that the adjustment is in no wise effected by the relative position of the casing, since the spring is not connected at all to the casing. It is therefore possible to construct and assemble the parts entirely independent of the casing.

I claim:

1. In a retard Bourdon gauge, a tube, a pointer, multiplying mechanism connecting the movable end of the tube and the pointer, a frame for supporting said mechanism, and a spring connected at its ends to said frame and to the movable end of said tube, at least one of said connections permitting a relative limited free movement so that said spring has no effect on the movement of the tube through a certain range of movement of the pointer, but is adapted to retard the movement of the tube beyond said range of expansive movement.

2. In a retard Bourdon gauge, a tube, a pointer, a sector connecting the movable end of said tube and said pointer, a frame for supporting said pointer, a spring having a sliding connection with said frame and connected to the movable end of said tube whereby said spring will retard the movement of said tube when the latter has moved a certain distance in an increased pressure registering direction.

3. In a retard Bourdon gauge, a tube, a frame, a sector suitably carried by said frame and connected to the movable end of said tube, a spring connected at one end of said frame and having a sliding connection with the movable end of said tube whereby the spring will have no effect on said tube during the normal range of movement of the latter but will retard the movement of the tube after a pre-determined movement of said tube in an increased pressure registering direction.

4. In a retard Bourdon gauge, a tube, a frame, a sector carried thereby and connected to said tube, and a spring having a sliding connection with the movable end of said tube and a sliding connection with said frame whereby said tube will be unaffected by said spring during the normal range of movement but will be retarded in its movement after a pre-determined movement of said tube in an increased pressure registering direction.

5. In a retard Bourdon gauge, a tube, a frame, a sector carried by said frame and connected to the movable end of said tube, said frame and said tube having projecting lugs, and a spring having terminal pieces slidably mounted in said lugs whereby said spring will not affect the movement of said tube until a pre-determined pressure has been reached and the tube consequently moved a pre-determined distance.

JOSIAH W. PLACE.